United States Patent

[11] 3,585,761

| [72] | Inventors | Warren J. Hughes<br>Centerville;<br>Donald H. Mabey, Salt Lake City, both of,<br>Utah |
|---|---|---|
| [21] | Appl. No. | 788,838 |
| [22] | Filed | Jan. 3, 1969 |
| [45] | Patented | June 22, 1971 |
| [73] | Assignee | Christensen Diamond Products Company<br>Salt Lake City, Utah |

[54] ROTARY CUTTER ASSEMBLY
19 Claims, 4 Drawing Figs.
[52] U.S. Cl. .................................................. 51/207
[51] Int. Cl. .............................................. B24d 5/00
[50] Field of Search .......................................... 51/206,
206.4, 206.5, 207, 204, 168, 356; 15/13 — 15, 5

[56] References Cited
UNITED STATES PATENTS
| 1,984,936 | 12/1934 | Larsson ....................... | 51/206 |
| 3,376,673 | 4/1968 | Metzger et al. ................ | 51/168 |

FOREIGN PATENTS
| 864,760 | 4/1961 | Great Britain ................ | 51/206.4 |

Primary Examiner—Othell M. Simpson
Attorney—Bernard Kriegel

ABSTRACT: A rotary cutter assembly in which an arbor has end plates and a multiplicity of saw discs and disc-separating spacers surrounding the arbor between the end plates. Bolts clamp the spacers and the saw discs to each other and to the end plates, the bolts also keying the spacers directly to the arbor so that torque is transmitted from the arbor to the spacers, and from the spacers to the saw discs.

INVENTORS.
WARREN J. HUGHES
DONALD H. MABEY
By Bernard Kriegel
ATTORNEYS.

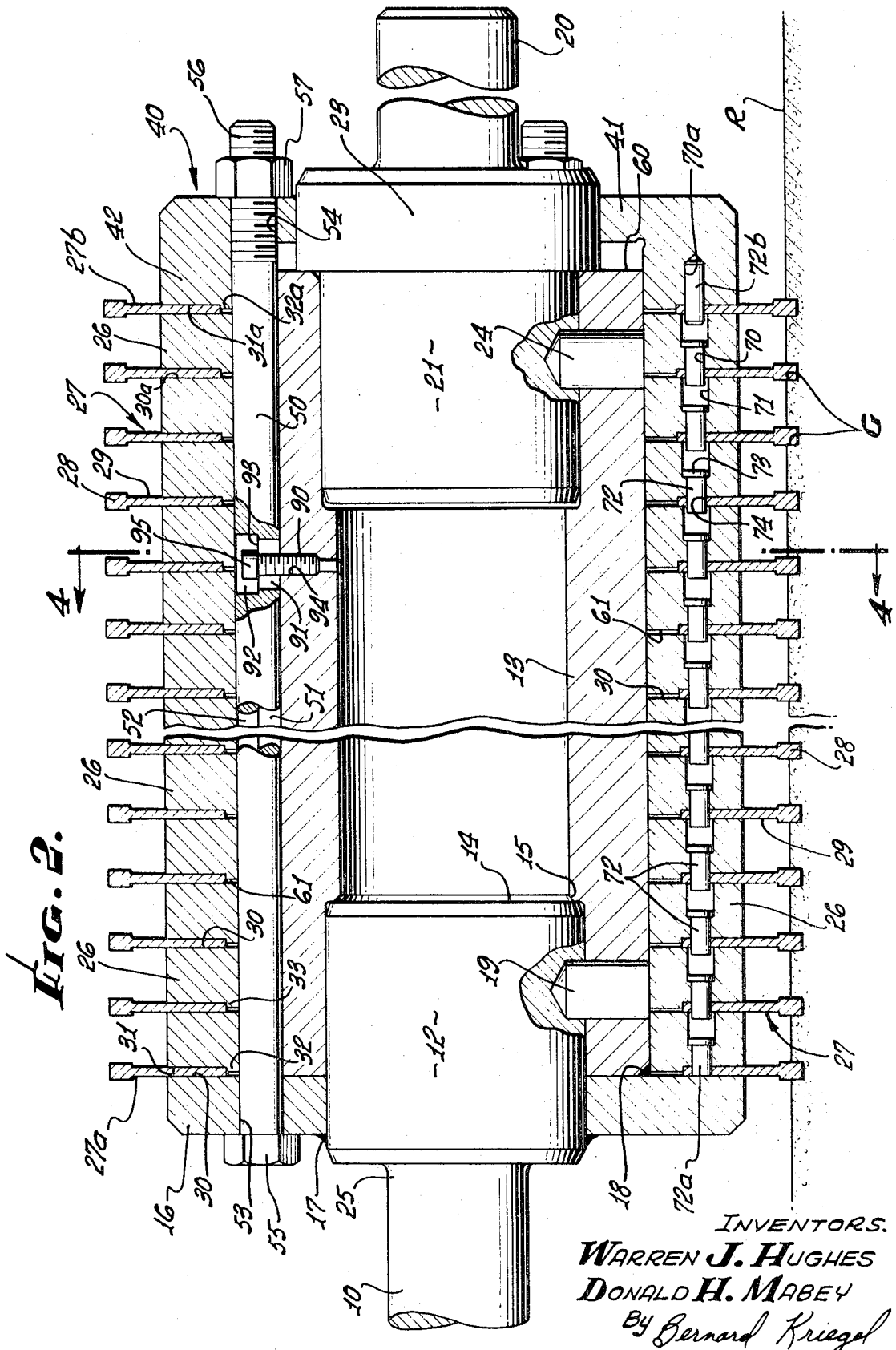

ROTARY CUTTER ASSEMBLY

The present invention relates to rotary cutter assemblies, and more particularly to cutter assemblies for effecting a cutting action on concrete and similar highway and airport runway surfaces, to remove bumps from the surfaces, to produce parallel grooves therein, or both.

Rotary cutter assemblies have been provided in which a plurality of saw discs are mounted on an arbor or mandrel separated by spacer members, to form grooves in concrete highway or runway surfaces. One such assembly is disclosed in U.S. Pat. No. 3,376,673. Such assemblies may be rather long. As an example, the overall effective cutting width of the saw blades or discs may be 36 to 60 inches. Such extended length of assembly makes it difficult to assemble the parts on the mandrel or arbor, particularly where the saw blades themselves must be slipped longitudinally along the arbor into position with the spacers therebetween, as for the purpose of replacing saw blades when worn. In prior assemblies, the periphery of the mandrel or arbor may have been peened by the relatively thin saw blades during operation of the assembly in performing its cutting action in the work. Such peening creates interference and prohibits longitudinal sliding of the saw blades along the arbor surface during assembly, as well as rendering it difficult to disassemble the saw blades from the arbor surface. Where peening has occurred it is sometimes necessary to discard the arbor or effect its repair, which is rather costly. In some rotary cutter assemblies, the spacers also bear upon the periphery of the arbor or mandrel, and due to their limited axial extent also deform the surface by producing a peening action thereon. With such deformation, assembly and disassembly of the parts of the rotary cutter mechanism becomes relatively difficult.

As noted above, it is desirable for the entire assembly to be rigid, but the rigidity of the rotary cutter blades or discs themselves has been limited in prior assemblies, since the unsupported height of the cutter blades is greater than is necessary in performing effectively on the work surface.

The foregoing disadvantages of the prior devices are overcome with the present invention. A rotary cutter assembly is provided in which bolts clamp the spacer members and intervening cutter blades against one another and between end plates, the inner rims of the saw blades being disposed outwardly of the mandrel periphery, preventing their contact therewith and their damaging the arbor. In addition, the saw blades and spacers are related to each other in such manner that the axial extent and the bearing surface of the spacers on the mandrel is much greater than was heretofore possible, thereby providing a larger area of contact between the arbor surface and the inner surface of the spacers, producing a lower unit stress therebetween and avoiding the deleterious peening action of spacers on the arbor surface. If any deformations occur, it occurs on the spacer, rather than on the arbor. Since the spacer is relatively inexpensive as compared to an elongate arbor, considerable economies are effected. In addition, since the peripheral surface of the arbor remains undisturbed, it is relatively easy to the blade and spacer assembly to be mounted on the arbor, as well as removed therefrom, thereby rendering assembly and disassembly of the entire mechanism faster and easier of accomplishment.

Circumferentially spaced bolts are employed to clamp the spacer and blade members together, as well as between end plates mounted on the arbor, and these same bolts are availed of to effect a driving torque-transmitting connection between the arbor and the spacers, the bolts serving as direct key connections between the arbor and the spacers. As further assurance that a positive drive is effected to the saw blades, the latter are pin connected to the spacers themselves, the saw blades being appropriately centered on the spacers, which, being snugly mounted on the arbor, appropriately center the saw blades relative to the arbor axis. Thus, the clamping bolts serve the dual purpose of effecting a clamping action between the end plates, saw blades and spacers, and a direct torque-transmitting key connection between the arbor and the spacers. The entire assembly provides a rigid cutter blade mounting, the unsupported blade height being minimized, consistent with appropriate spacing between the periphery of the spacers and the surface of the work, such as a highway surface being operated upon, to provide the required clearance for the removal of cuttings, pebbles, junk, or other debris that might be present on the surface as the cutter assembly moves thereover in the performance of its cutting action.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the Drawings:

FIG. 2 is an enlarged longitudinal section taken on the line 2–2 on FIG. 1;

Figure 1:
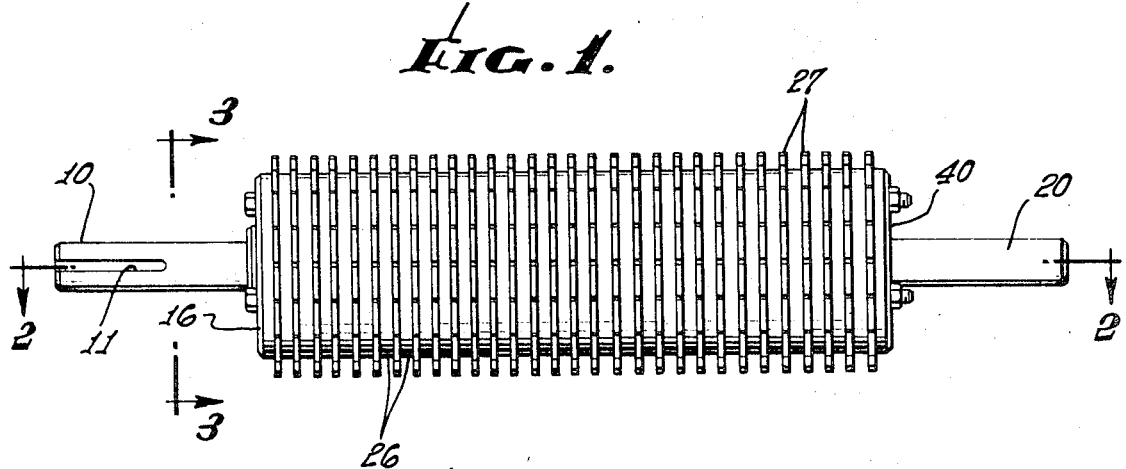
FIG. 1 is a side elevation of a cutter assembly embodying the invention.
Figure 3:
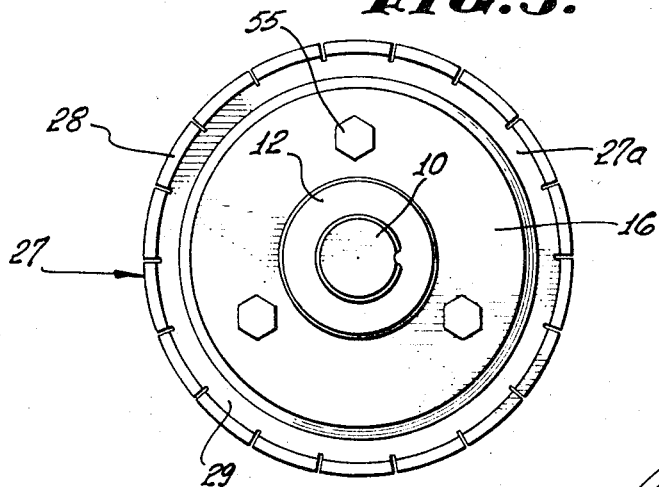
FIG. 3 is an enlarged section taken on the line 3–3 on FIG. 1.
Figure 4:
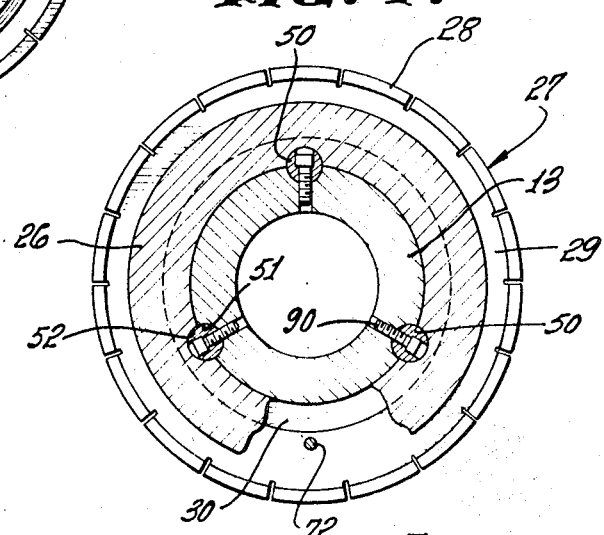
FIG. 4 is a cross section, on a reduced scale, taken along the line 4–4 on FIG. 2.

The rotary cutter assembly illustrated in the drawings is carried by a suitable vehicle (not shown) designed for cutting bumps from the surfaces R of concrete highways, airstrips, and the like, or for providing parallel grooves G in such surfaces for the purpose of improving traction of the vehicle tires on the surfaces, allowing water to run off such surfaces, and other desirable objectives. A suitable drive mechanism rotates the assembly, which includes a drive shaft 10 at one end thereof having a keyway 11 to receive a sheave or pulley (not shown) forming the driven member of a belt drive for rotating the assembly from a suitable engine or other source of motive power. This drive shaft has an enlarged head 12 piloted within a cylindrical arbor or tubular mandrel 13, with its end 14 abutting a shoulder 15 provided in the mandrel. The shaft 10 is secured to an axially fixed end plate 16, as by use of welding material 17, an end of the mandrel also being secured to the inner face of the plate, as by the use of welding material 18. Moreover, the mandrel 13 is attached directly to the enlarged head 12 of the drive shaft by a plurality of circumferentially spaced plug welds 19. Because of the welding of the shaft, fixed end plate, and mandrel to one another, they are, in effect, integrally secured together, forming a rigid structure.

Another shaft 20 is located at the opposite end of the mandrel, this shaft having an enlarged head 21 received within the bore 22 of the mandrel, there being a shaft flange 23 engaging the end of the mandrel. The head 21 of the shaft is secured to the end portion of the mandrel or arbor by circumferentially spaced plug welds 24 that integrate the parts to one another, with the flange 23 snugly engaging the end of the arbor or mandrel 13. The portions 25 of the drive shaft 10 adjacent its enlarged head 12, illustrated at the left of FIG. 2, as well as the other shaft 20 adjacent its flange 23, provided surfaces to receive suitable bearings (not shown) for mounting the assembly in the frame (not shown) of the bump-cutting or grooving machine. Since such bearing arrangement is known and conventional, it has not been illustrated in the drawings.

The arbor or tubular mandrel 13 is cylindrical in form and has a plurality of spacers 26 mounted thereon for longitudinal slidable movement. These spacers alternate with circular saw blades or discs 27, the spacers retaining the saw blades spaced from one another to the desired extent. Each of the saw blades or discs has a rim portion 28 that may have a matrix of diamonds and other materials thereon for cutting a concrete roadway or airstrip R, this rim portion having a greater axial extent than the main body 29 of the saw blades disposed radially therewithin. As disclosed, an end saw blade 27a abuts the inner face 30 of the fixed end plate, a spacer 26 having one face 31 abutting the opposite side of the saw blade, a mounting rim 32 extending from this face within the inner periphery 33 of the saw blade in order to mount and retain the saw blade coaxial of the drive shaft 10 and mandrel 13. However, the mounting rim 32 is of lesser axial extent than the body 29 of the saw blade so as to be free from contact with the inner face 30 of the fixed end plate 16.

Additional saw blades 27 and spacers 26 are alternately arranged with respect to one another along the entire length of the tubular mandrel, which, for example, may be about 3 feet to 5 feet in length, depending upon the overall width of the cut to be taken in the concrete surface R. In each instance, the saw blade 27 is mounted upon the rim portion 32 of the spacer when the face 31 of the spacer outwardly of its rim portion 32 engaging the face 30a of the adjacent spacer, or, in the case of the first saw blade 27a, the inner face 30 of the fixed end plate.

At the opposite end of the mandrel 13, an axially slidable end plate 40 is disposed. This end plate has an inner disc portion 41 slidable longitudinally on the flange 23 of the shaft 20, there being a skirt portion 42 extending axially inwardly from the disc portion and slidable along the periphery of the mandrel 13. This skirt portion has a mounting rim 32a, which is the same as the mounting rim 32 on the spacers 26, the inner face 31a of the skirt engaging the side of the outermost saw blade 27b.

The spacers 26 and saw blades 27 are clamped firmly together and between the plates 16, 40 by a plurality of longitudinally extending and circumferentially spaced bolts 50. These bolts not only serve to clamp the saw blades and spacers together, but they also serve as driving keys for transmitting torque from the mandrel 13 to the spacers 26. As disclosed, the mandrel is provided with circumferentially spaced, longitudinally extending keyways 51 of the semicircular form, which are opposed by corresponding keyways 52 of semicircular form provided in the spacers 26. The fixed end plate 16 has circumferentially spaced holes 53 extending longitudinally therethrough in alignment with the keyways 51, 52 in the mandrel and spacers, such that each bolt extends through the hole 53 and through the keyways 51, 52 and also through a companion hole 54 in the slidable end plate 40. The head 55 of the bolts engage the outer face of the fixed end plate 16, the opposite end portions 56 of the shanks of the bolts being of threaded form to receive companion nuts 57 adapted to be brought to bear against the outer face of the slidable end plate 40.

By tightening the nuts 57, the saw blade discs 26 and intervening spacers 26 are firmly clamped between the fixed end plate 16 and slidable end plate 40, while the torque is transmitted directly from the mandrel 13 through the bolt key 50 to the spacers 26 and from the spacers to the saw blades 27 clamped therebetween. During the clamping action, the spacers and saw discs are urged axially toward the fixed end plate 16, the slidable end plate 40 shifting axially on the mandrel 13, as well as on the flange 23, there being sufficient space allowed between the end 60 of the arbor or mandrel and the inner face of the disc portion 41 of the slidable end plate to permit the sliding action to occur. It is further to be noted that the face 61 of the mounting rim of each spacer 26 and plate 40 will be in spaced relation to the opposed face of an adjacent spacer, and that such face 61 of the end spacer is free from contact with the inner face 30 of the fixed end plate 16, to prevent the spacers from interfering with the firm and full clamping of the saw blades therebetween, against the inner face 30 of the fixed end plate 16, and against the inner face 31a of the slidable end plate 40.

A positive drive connection is also provided between the spacers 26 and the saw blades 27. Thus, each spacer has an axial hole 70 therethrough located in a predetermined angular relation to one of the spacer keyways 52, this hole having a counterbore 71 that permits a driving pin 72 to be inserted through the counterbore portion and the remainder of the hole 70, with the head 73 of the drive pin engaging the base of the counterbore 71, the drive pin extending snugly into a companion hole 74 in the saw blade 27. It is apparent that the drive pin 72 effects a positive connection between a spacer 26 and saw blade 27 through which torque may be transmitted from the spacer to the saw blade. However, the saw blades 26 are so firmly clamped between the spacers 26 and between the end spacers and adjacent fixed and slidable end plates 16, 40 that a substantial torque can be transmitted safely and without slippage to the saw blades in the absence of the drive pins. The end drive pin 72a adjacent to the fixed end plate 16 is of shorter length, to avoid its extending completely through the saw blade 27a in which it fits; whereas, a drive pin 72b is disposed within a bore 70a in the skirt portion 42 of the slidable end plate for reception within a companion hole in the adjacent end saw blade 27b.

To facilitate assembly of the blades and spacers onto the arbor or mandrel, each bolt 50 can be held in place within the arbor keyway 51 against substantial lateral deflection by a capscrew 90. As disclosed, each bolt 50, preferably near the nut end thereof, has an elongate slot 91 therein, the outer portion 92 of the slot being of enlarged width to provide shoulders 93 on opposite sides of the inner portion of the slot. A clamp capscrew 90 extends through the slot and is screwed into a threaded radial hole 94 in the mandrel 13, with the head 95 of the screw engaging the shoulders 93 on opposite sides of the slot. The slot is longer than the diameter of the clamp screw 90, to permit the shank of the bolt 50 to partake of some axial movement or stretch along the mandrel and the spacers 26, as a result of tightening of the nuts 57 on the threaded shank portions of the bolts.

Assembly and disassembly of the saw blades 27 and spacers 26 is relatively fast and easy. Since the saw blades do not contact the periphery of the arbor 13, and since the spacers are of substantial axial extent, the spacers slide relatively freely along the periphery of the mandrel, avoiding peening or other deformation of the outer mandrel surface. Since peening or other damage to the peripheral surface of the mandrel is eliminated, the slidable assembly of the spacers 26 on the arbor 13, with the blades 27 intervening therebetween, is accomplished without interference.

The bolt keys 50 have two main functions. They not only serve to clamp the saw blades 27 between the spacers 26 and between the fixed and movable end plates 16, 40, but they also serve the function of transmitting torque from the mandrel 13 to the spacers 26, the torque then being transmitted to the saw blades 27 themselves. In this connection, the torque can also be transmitted positively from the spacers 26 to the saw blades 27 through the drive pins 72.

By virtue of the assembly disclosed in the drawings, a more rigid saw blade mounting is provided, since the unsupported height of each blade, that is, the part extending outwardly beyond the periphery of the spacers 26, can be held to a minimum consistent with clearance required between the spacers and the roadway surface R for the removal of cuttings, pebbles, metal junk, or other debris that might be encountered.

In connection with assembly and disassembly of the apparatus, the bolts 50 are held in a definite location on the mandrel 13 by virtue of the clamp or capscrews 90, avoiding their lateral shifting, of which they would be otherwise inclined to partake, in view of their comparatively extending length which, as indicated above, would usually be of the order of over 3 to 5 feet.

We claim:

1. In a rotary cutter assembly: rotatable shaft means; a mandrel rotatable with said shaft means; a plurality of annular cutters encircling said mandrel; a spacer between each pair of adjacent cutters; a first end plate at one end portion of said mandrel; an axially shiftable second end plate at the other end portion of said mandrel; circumferentially spaced clamping members extending from said first end plate to said second end plate to clamp said cutters and spacers to one another and between said end plates; said mandrel and spacers having opposed keyways receiving said clamping members to enable torque to be transmitted directly from said mandrel through said clamping members to said spacers.

2. In a rotary cutter assembly as defined in claim 1; said clamping members comprising longitudinally extending bolts.

3. In a rotary cutter assembly as defined in claim 1; said first end plate being secured to said mandrel; said second end plate being slidable axially on said mandrel; each clamping member comprising a bolt having a head engaging one of said end plates, a shank extending through a mandrel keyway and spacer keyways opposed thereto, and a nut threaded on said shank and engaging said other of said end plates.

4. In a rotary cutter assembly as defined in claim 1; said clamping members comprising longitudinally extending bolts; and means securing said bolts to said mandrel to retain said bolts in said mandrel keyways.

5. In a rotary cutter assembly as defined in claim 1; said first end plate being secured to said mandrel; said second end plate being slidable axially on said mandrel; each clamping member comprising a bolt having a head engaging one of said end plates, a shank extending through a mandrel keyway and spacer keyways opposed thereto, and a nut threaded on said shank and engaging said other of said end plates; and means securing said bolts to said mandrel to retain said bolts in said mandrel keyways.

6. In a rotary cutter assembly as defined in claim 1; said spacers having mounting rims; said annular cutters being mounted on said rims with the inner peripheries of said cutters disposed radially outwardly of the periphery of said mandrel.

7. In a rotary cutter assembly as defined in claim 1; and means providing a rotatable driving connection between said spacers and annular cutters.

8. In a rotary cutter assembly as defined in claim 1; and a pin extending between each spacer and adjacent annular cutter and providing a rotatable driving connection therebetween.

9. In a rotary cutter assembly as defined in claim 1; said spacers having mounting rims; said annular cutters being mounted on said rims with the inner peripheries of said cutters disposed radially outwardly of the periphery of said mandrel; and means providing a rotatable driving connection between said spacers and annular cutters.

10. In a rotary cutter assembly as defined in claim 1; said spacers having mounting rims; said annular cutters being mounted on said rims with the inner peripheries of said cutters disposed radially outwardly of the periphery of said mandrel; and a pin extending between each spacer and adjacent annular cutter and providing a rotatable driving connection therebetween.

11. In a rotary cutter assembly as defined in claim 1; said first end plate being secured to said mandrel; said second end plate being slidable axially on said mandrel; each clamping member comprising a bolt having a head engaging one of said end plates, a shank extending through a mandrel keyway and spacer keyways opposed thereto, and a nut threaded on said shank and engaging said other of said end plates; said spacers having mounting rims; and annular cutters being mounted on said rims with the inner peripheries of said cutters disposed radially outwardly of the periphery of said mandrel.

12. In a rotary cutter assembly as defined in claim 1; said first end plate being secured to said mandrel; said second end plate being slidable axially on said mandrel; each clamping member comprising a bolt having a head engaging one of said end plates, a shank extending through a mandrel keyway and spacer keyways opposed thereto, and a nut threaded on said shank and engaging said other of said end plates; said spacers having mounting rims; said annular cutters being mounted on said rims with the inner peripheries of said cutters disposed radially outwardly of the periphery of said mandrel; and a pin extending between each spacer and adjacent annular cutter and providing a rotatable driving connection therebetween.

13. In a rotary cutter assembly as defined in claim 1; said first end plate being secured to said mandrel; said second end plate being slidable axially on said mandrel; each clamping member comprising a bolt having a head engaging one of said end plates, a shank extending through a mandrel keyway and spacer keyways opposed thereto, and a nut threaded on said shank and engaging said other of said end plates; said spacers having mounting rims; said annular cutters being mounted on said rims with the inner peripheries of said cutters disposed radially outwardly of the periphery of said mandrel; a pin extending between each spacer and adjacent annular cutter and providing a rotatable driving connection therebetween; and means securing said bolts to said mandrel to retain said bolts in said mandrel keyways.

14. In a rotary cutter assembly: rotatable shaft means; a mandrel rotatable with said shaft means; a plurality of annular cutters encircling said mandrel; a spacer between each pair of adjacent cutters; a first end plate at one end portion of said mandrel; an axially shiftable second end plate at the other end portion of said mandrel; circumferentially spaced clamping members disposed radially inwardly of said cutters and extending through said spacers from said first end plate to said second end plate to clamp said cutters and spacers to one another and between said end plates; said spacers having mounting rims; said annular cutters being mounted on said rims with the inner peripheries of said cutters disposed radially outwardly of the periphery of said mandrel.

15. In a rotary cutter assembly as defined in claim 14; and means providing a rotatable driving connection between said spacers and annular cutters.

16. In a rotary cutter assembly: rotatable shaft means; a mandrel rotatable with said shaft means; a plurality of annular cutters encircling said mandrel; a spacer between each pair of adjacent cutters; a first end plate at one end portion of said mandrel; an axially shiftable second end plate at the other end portion of said mandrel; circumferentially spaced clamping members extending from said first end plate to said second end plate to clamp said cutters and spacers to one another and between said end plates; said spacers having mounting rims; said annular cutters being mounted on said rims with the inner peripheries of said cutters disposed radially outwardly of the periphery of said mandrel; and a pin extending between each spacer and adjacent annular cutter and providing a rotatable driving connection therebetween.

17. In a rotary cutter assembly: rotatable shaft means; a mandrel rotatable with said shaft means; a plurality of annular cutters encircling said mandrel; a spacer between each pair of adjacent cutters; a first end plate at one end portion of said mandrel; an axially shiftable second end plate at the other end portion of said mandrel; means disposed radially inwardly of said cutters and extending through said spacers for clamping said cutters and spacers to one another and between said end plates; said spacers having mounting rims; said annular cutters being mounted on said rims with the inner peripheries of said cutters disposed radially outwardly of the periphery of said mandrel.

18. In a rotary cutter assembly as defined in claim 17; and means providing a rotatable driving connection between said spacers and annular cutters.

19. In a rotary cutter assembly: rotatable shaft means; a mandrel rotatable with said shaft means; a plurality of annular cutters encircling said mandrel; a spacer between each pair of adjacent cutters; a first end plate at one end portion of said mandrel; an axially shiftable second end plate at the other end portion of said mandrel; means clamping said cutters and spacers to one another and between said end plates; said spacers having mounting rims; said annular cutters being mounted on said rims with the inner peripheries of said cutters disposed radially outwardly of the periphery of said mandrel; and a pin extending between each spacer and adjacent annular cutter and providing a rotatable driving connection therebetween.